V. P. RATZBURG.
ARMOR FOR VEHICLE TIRES.
APPLICATION FILED MAR. 7, 1908. RENEWED NOV. 12, 1917.
1,338,843.                                    Patented May 4, 1920.
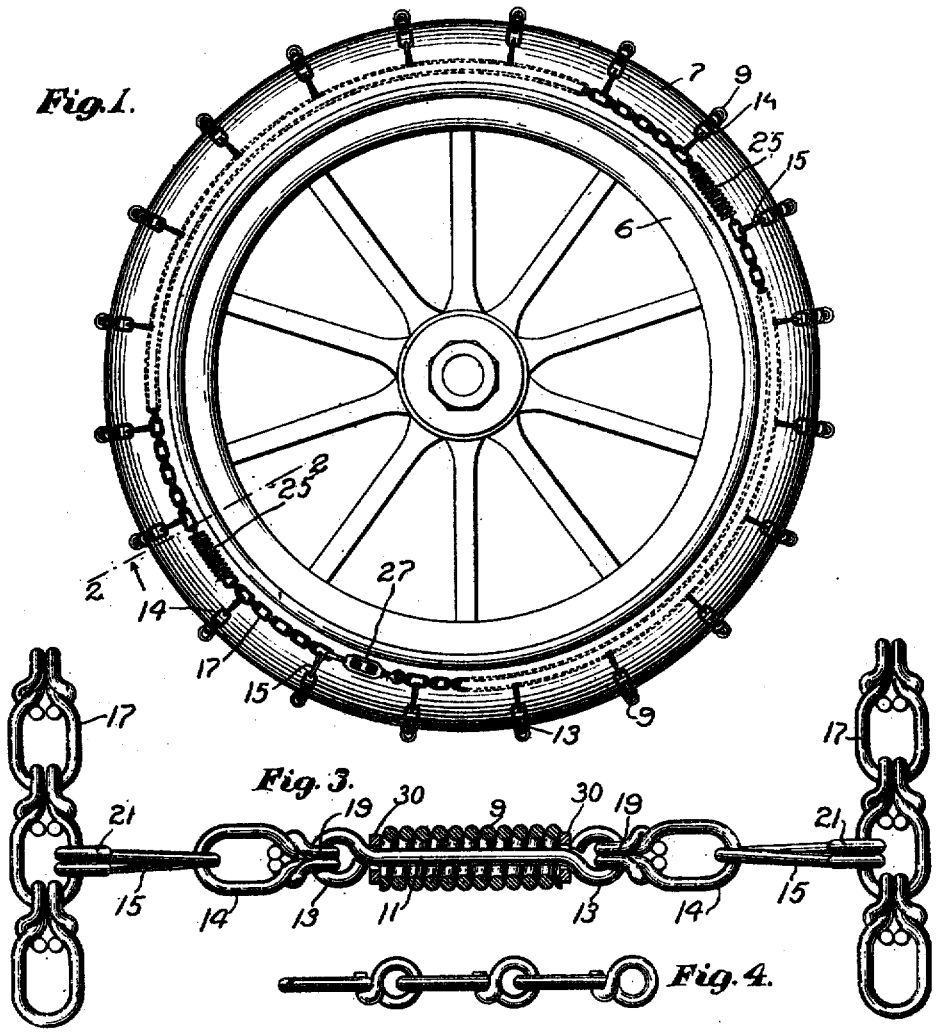
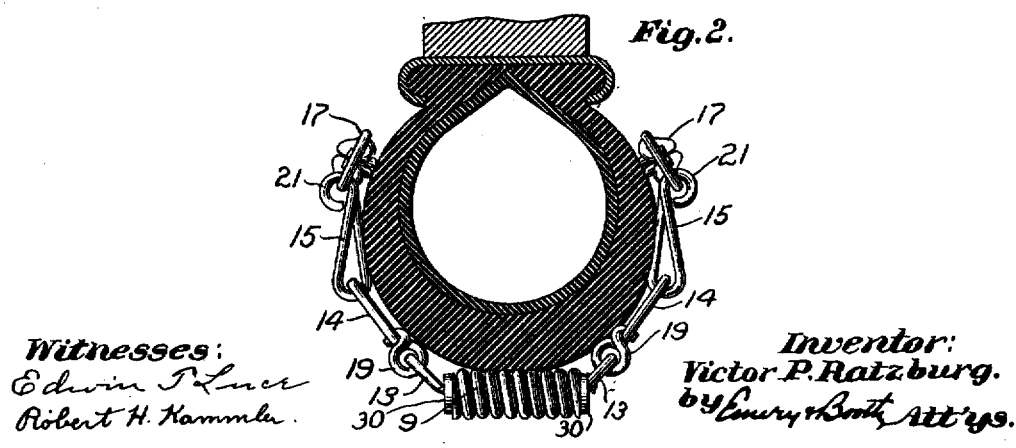

UNITED STATES PATENT OFFICE.

VICTOR P. RATZBURG, OF NASHUA, NEW HAMPSHIRE, ASSIGNOR, BY MESNE ASSIGNMENTS, TO BARRELL HOLDING AND MANUFACTURING COMPANY, OF PORTLAND, MAINE, A CORPORATION OF MAINE.

ARMOR FOR VEHICLE-TIRES.

1,338,843.   Specification of Letters Patent.   Patented May 4, 1920.

Application filed March 7, 1908, Serial No 419,665. Renewed November 12, 1917. Serial No. 201,661.

*To all whom it may concern:*

Be it known that I, VICTOR P. RATZBURG, a citizen of the United States, residing at Nashua, in the county of Hillsborough, State of New Hampshire, have invented an Improvement in Armor for Vehicle-Tires, of which the following description, in connection with the accompanying drawings, is a specification, like letters on the drawings representing like parts.

This invention pertains to armor for vehicle tires which may serve as reinforcement against wear as a preventative of skidding or both.

The tire armor is subjected to destructive abrasion, which soon wears away those parts presented continuously at the tread. For example, in some armors heretofore used, the tread comprised transversely disposed chains, which, impacting against the roadway, were rapidly demolished at their immediate tread portions while remaining in good condition elsewhere. With such wear, it was required that the armor be discarded, even though other parts of the transverse chains may have remained substantially unworn. It has been proposed to surmount this difficulty and prolong the utility of armor by making it reversible to permit one side when worn to be replaced by a diametrically opposite side. The only suggestion which has been made in this regard, however, has involved removal from the tire of the entire armor preparatory to reversing it and a subsequent replacement and re-adjustment. Moreover, only diametrically opposite parts of the tread members were utilized to receive wear, while intervening lateral and other parts thereof would remain unworn and be wasted in discarding the whole.

It is an object of this invention, *inter alia*, to avoid such difficulties as have been experienced heretofore in making and using anti-skidding tire armors. The character of the invention may be best understood by reference to the accompanying drawings, which show, for purposes of illustration, a construction embodying the various features.

In the drawings,—

Figure 1 is a side elevation of a wheel and tire associated with an illustrative form of armor;

Fig. 2 is a transverse radial section of the wheel on the line 2—2 of Fig. 1;

Fig. 3, an enlarged detail showing a practicable form of tread member associated with convenient holding means;

Fig. 4 is a side elevation of holding means of desirable but non-essential form.

Referring to Fig. 1, the invention to be described is applied to the vehicle wheel 6 and the pneumatic tire 7. Upon the tire 7 is positioned anti-skidding armor comprising annular holding members, shown as chains disposed co-axially with the tire on opposite sides thereof, and tread members disposed across the tread of the tire.

As illustrated in Fig. 3, a tread member may have at its immediate tread means, for instance a coil spring 9, rotatably mounted to permit presentation of all parts of its surface to receive contact with the roadbed and resulting wear. While the specific disclosure presents a coil spring 9, this is by no means essential, since any other practicable means might be substituted. In the specific illustration the cylindrical coil spring 9 is mounted upon a shaft member 11, the latter having at its respective ends eyes 13, 13 connected by links 14, 14 and 15, 15 with the holding members of the armor which may be chains 17, 17 or any practicable substitute. Preferably the arrangement shown is such that the spring 9, or a comparable element in the combination, may have free movement in relation to the shaft or other member upon which it is mounted—thus providing that the latter may remain substantially stationary, while the former, at the tread of the armor, may be adjusted to present different parts of its surface to receive wear. Any practicable number of tread members may be used and they may be associated in any suitable relation to means, such as chains 17, 17 for contributing to hold them in proper position relative to the tire.

Referring now to Fig. 2, it will be seen that the immediate tread device 9 stands in a substantially tangential relation to the crown of the tire and the shaft member 11 has its eyes 13, 13 turned toward the tire; not only to suit the proximate conformation of the tire, but also in order that all parts of said shaft member 11 shall occupy retired positions remote from the actual tread of the armor. With such an arrangement the immediate tread member 9 is the only part of the armor subjected to wear, and it may be completely worn through without in the least degree affecting the remainder of the armor or its continuity or integrity. While some wear takes place between the links of the transversely disposed tread members and of the said holding chains, this is not comparable in degree with the destructive wear on the immediate tread portion of the armor resulting from impact against and abrasion by the road. Accordingly, the provision of a wear receiving member to supply the immediate tread and to be subjected to the destructive abrasion without impairing the integrity of the armor, is of great advantage.

Preferably, each eye 13, 13 of the shaft member 11 is engaged by an eye 19 of a link 14, the loop of the latter being disposed so as to lie flatwise relative to the tire with the plane of its eye 19 approximately perpendicular to the tire. This contributes to hold the shaft member eyes 13, 13 flatwise relative to the tire, so as to keep them in their retired position remote from the actual tread. The links 14, 14 in turn may be engaged by the links 15, 15 and the latter so connected by snug eyes 21, 21 to the side chains 17, that the entire tread member intervening between the side holding chains shall be held substantially flat in relation to the tire without being permitted any material angular movement. Such a provision serves to maintain all parts of the armor in preferred retired position remote from the tread, so that no part except the immediate tread device shall receive material wear against the roadway.

In using the exemplary embodiment of the invention shown in the drawings, the armor may be applied either before or after inflating the tire; and when in assembled position it need not be in any manner attached by straps or the like to the spokes or felly of the wheel. I prefer, instead, to provide a frictional grip between armor and tire to prevent undesirable looseness or free movement of the former on the latter. In this respect I follow a practice well-known in the art in which, for instance, the grip has been sufficient to embed parts of the armor slightly in the surface of the tire. Even with such an arrangement it is probably impossible to prevent creeping of the armor circumferentially of the tire.

Contradistinguished from the frictional grip arrangement of the early art adopted in the present invention, it has been proposed, as exemplified in the well-known chain armor, to associate the armor and tire loosely to permit free circumferential movement of the former on the latter. This, however, is undesirable because such looseness permits the armor to rattle and sag with a great amount of slack which must be taken up as the armor wears, and is otherwise injurious.

The present invention follows the prior art to the extent of employing the frictional grip to prevent all free movement, looseness, sag and rattling. At the same time any inherent circumferential creeping does not impair the tire, since the tread members in the preferred embodiment move over the tire with a rolling contact, instead of being dragged bodily along the surface thereof. In fact this inherent creeping movement with snug frictional engagement between the tire and armor is utilized to promote the automatic adjustment of tread members to present new wear receiving portions thereof at the tread of the armor.

To secure a suitable friction grip between tire and armor, the latter is preferably provided with springs 25, 25 (Fig. 1) inserted in the side chains 17, 17 or elsewhere. The free ends of the side chains or their substitutes may be connected by turnbuckles 27. When the armor is placed in position on the tire the buckles may be screwed up so as to place the springs 25, 25 under sufficient tension to embed parts of the armor slightly in the tire to create a frictional grip between the two sufficient to prevent free relative movement. In this manner the armor is held snugly in place; the disagreeable rattling of loose armor may be avoided; and the complete response of the armor to variations in form of the tire is in no wise obstructed.

With the construction shown in the drawings, whenever one of the immediate tread devices 9 strikes the ground, it will be rotated slightly upon the shaft member 11, so as to present a new wearing surface for the next impact against the roadway. In succession, every portion of the member 9 may be thus presented and subjected to wear which, in respect of the spring as a whole will be very gradual.

If desired a washer 30 may be interposed between each end of a tread member 9 and the adjacent eye 13 of the shaft member 11, such washer serving as a smooth bearing plate against which the end of the tread member may move.

Various changes other than those particularly pointed out will be apparent to those familiar with the art, as will also appear the fact that the exemplary construction herein described may be variously changed and modified without departing from the scope of the invention.

Claims:

1. Tire armor comprising, in combination, a tread member arranged to extend across the tread surface of the tire; a shaft member on which said tread member is journaled to rotate when in use; and provision for positioning said elements in suitable relation to a tire and permitting the armor to move circumferentially about the tire whereby said tread member, by reason of its contact with the tread surface of the tire, will roll thereon and turn on said shaft member.

2. Tire armor comprising, in combination, separate, spaced elastic tread members; positioning or holding means therefor on which said tread members are mounted to rotate freely when in use; and provision for engaging the sides of the tire though unsecured thereto thereby to hold the armor snugly against the tire simply by its engagement with the tire.

3. Tire armor comprising, in combination, a tread device; a shaft member on which said tread device is mounted to rotate when in use; and provision for holding the shaft member in substantially constant relation to the proximate surface of the tire while providing for a shifting of the armor circumferentially of the tire accompanied by a rolling action of said tread devices along the tread surface.

4. Tire armor comprising, in combination, a hollow cylindrical tread device; a shaft member on which said tread member is mounted to rotate when in use; and provision for positioning or holding the same in proper relation to the tire while providing for a shifting of the armor circumferentially of the tire accompanied by a rolling action of said tread devices along the tread surface.

5. Tire armor comprising, in combination, a hollow cylindrical tread device; a shaft member on which said tread device is mounted to rotate when in use, said shaft member being substantially axially disposed in relation thereto; and provision to position or hold the same in proper relation to the tire while providing for a shifting of the armor circumferentially of the tire accompanied by a rolling action of said tread devices along the tread surface.

6. Tire armor comprising, in combination, a plurality of individually rotatable tread devices; annular holding means at the sides of the armor and having connected thereto the tread devices; and yielding means in said holding means to maintain the rotatable tread devices against the tread surface of the tire and the armor as a whole snugly on a tire while permitting the inherent creeping movement of the same in use, whereby the tread devices are permitted a combined rotary and creeping movement on the surface of the tire.

7. Tire armor comprising a pair of side members, a series of tread members spaced on the tire and connections between said side members and said tread members, each of said tread members comprising a rotatably mounted spiral gripping device confined between bearings.

8. Tire armor comprising a series of tread members each having a shaft carrying a rotatable spiral gripping element confined against longitudinal extension, a pair of side chains, and connections between said tread members and side chains.

9. Tire armor comprising a pair of side chains, a series of shaft members adapted to be spaced on the tire and having rigid eyes extending at angles from said shaft members, spiral gripping devices rotatable on said shaft members, and releasable hook connections between the respective eyes and said side chains.

10. Tire armor comprising a number of flexible cross members extending across said tire at intervals around the periphery thereof, each of said cross members comprising a relatively unyielding roller, each of which has a spiral blunt edged projection adapted to be gripped between the tire and the ground, each cross member also comprising means for allowing the roller to rotate relatively to the tire, supporting means extending around the wheel at each side thereof but free from direct attachment to the wheel and to which said cross members are attached at each end thereof.

In testimony whereof, I have signed my name to this specification, in the presence of two subscribing witnesses.

VICTOR P. RATZBURG.

Witnesses:
 EDWARD H. WASON,
 JAMES H. HUNT.